(12) United States Patent
Johansen et al.

(10) Patent No.: US 8,803,361 B2
(45) Date of Patent: Aug. 12, 2014

(54) APPARATUS AND METHOD FOR PROVIDING UNINTERRUPTIBLE POWER

(75) Inventors: Flemming Johansen, Kolding (DK); Henning Roar Nielsen, Brenderup (DK)

(73) Assignee: Schneider Electric IT Corporation, West Kingston, RI (US)

( * ) Notice: Subject to any disclaimer, the term of this patent is extended or adjusted under 35 U.S.C. 154(b) by 682 days.

(21) Appl. No.: 13/009,670

(22) Filed: Jan. 19, 2011

(65) Prior Publication Data

US 2012/0181871 A1    Jul. 19, 2012

(51) Int. Cl.
*H02J 7/00* (2006.01)
*H02J 9/00* (2006.01)

(52) U.S. Cl.
USPC .................................................. 307/64

(58) Field of Classification Search
CPC ....... H02J 9/00; H02J 9/091; H02J 2009/068; H02J 7/345; H02J 9/04; H02J 3/006; H02J 9/06
USPC ..................................... 307/64–66
See application file for complete search history.

(56) References Cited

U.S. PATENT DOCUMENTS

| | | |
|---|---|---|
| 3,805,139 A | 4/1974 | Hoffman, Jr. et al. |
| 4,065,711 A | 12/1977 | Kawabata |
| 4,104,539 A | 8/1978 | Hase |
| 4,272,717 A | 6/1981 | Bailey |
| 4,315,163 A | 2/1982 | Bienville |
| 4,564,767 A | 1/1986 | Charych |
| 4,621,313 A | 11/1986 | Kiteley |
| 4,648,015 A | 3/1987 | Davis et al. |
| 4,673,825 A | 6/1987 | Raddi et al. |
| 4,673,826 A | 6/1987 | Masson |
| 4,683,529 A | 7/1987 | Bucher, II |
| 4,763,013 A | 8/1988 | Gvoth, Jr. et al. |

(Continued)

FOREIGN PATENT DOCUMENTS

| | | |
|---|---|---|
| EP | 1187298 A2 | 3/2002 |
| JP | 11146575 A | 5/1999 |
| JP | 2004120857 A | 4/2004 |
| WO | 02060032 A1 | 8/2002 |

OTHER PUBLICATIONS

Notification of Transmittal of the International Search Report and the Written Opinion of the International Searching Authority from correspnding PCT/US2012/021715 mailed Jun. 8, 2012.

*Primary Examiner* — Carlos Amaya
(74) *Attorney, Agent, or Firm* — Lando & Anastasi, LLP

(57) ABSTRACT

Systems and methods of controlling an uninterruptible power supply are provided. The uninterruptible power supply includes an input to receive input power, and an output to provide power to a load. The uninterruptible power supply also includes an inverter, a bypass switch, and a controller. The inverter is coupled with the input and with the output, and the bypass switch can provide the input power at the output in a bypass mode of operation. The controller is coupled with the inverter and the bypass switch. The controller can activate the bypass switch in a first configuration to provide the input power at the output during a first half of a cycle of an input voltage waveform, and can activate the bypass switch in a second configuration to provide the input power at the output during a second half of the cycle. With the inverter active during bypass operation, the inverter can more quickly provide output power upon the loss of bypass power, and can provide near unity power factor correction and harmonic distortion correction.

16 Claims, 9 Drawing Sheets

(56) References Cited

U.S. PATENT DOCUMENTS

| | | |
|---|---|---|
| 4,782,241 A | 11/1988 | Baker et al. |
| 4,816,982 A | 3/1989 | Severinsky |
| 4,823,247 A | 4/1989 | Tamoto |
| 4,827,151 A | 5/1989 | Okado |
| 4,831,508 A | 5/1989 | Hunter |
| 4,964,029 A | 10/1990 | Severinsky et al. |
| 5,017,800 A | 5/1991 | Divan |
| 5,019,717 A | 5/1991 | McCurry et al. |
| 5,081,367 A | 1/1992 | Smith et al. |
| 5,126,585 A | 6/1992 | Boys |
| 5,142,163 A | 8/1992 | Hase |
| 5,148,043 A | 9/1992 | Hirata et al. |
| 5,198,698 A | 3/1993 | Paul et al. |
| 5,229,650 A | 7/1993 | Kita et al. |
| 5,241,217 A | 8/1993 | Severinsky |
| 5,254,928 A | 10/1993 | Young et al. |
| 5,264,732 A | 11/1993 | Fiorina et al. |
| 5,289,046 A | 2/1994 | Gregorich et al. |
| 5,291,383 A | 3/1994 | Oughton |
| 5,302,858 A | 4/1994 | Folts |
| 5,315,533 A | 5/1994 | Stich et al. |
| 5,384,792 A | 1/1995 | Hirachi |
| 5,422,558 A | 6/1995 | Stewart |
| 5,458,991 A | 10/1995 | Severinsky |
| 5,465,011 A | 11/1995 | Miller et al. |
| 5,477,091 A | 12/1995 | Fiorina et al. |
| 5,563,778 A | 10/1996 | Oh |
| 5,602,462 A | 2/1997 | Stich et al. |
| 5,612,580 A | 3/1997 | Janonis et al. |
| 5,616,968 A | 4/1997 | Fujii et al. |
| 5,646,459 A | 7/1997 | Hatate et al. |
| 5,684,688 A | 11/1997 | Rouaud et al. |
| 5,686,768 A | 11/1997 | Thomsen et al. |
| 5,751,564 A | 5/1998 | Dien |
| 5,796,223 A | 8/1998 | Ohtsuka et al. |
| 5,844,328 A | 12/1998 | Furst |
| 5,923,099 A | 7/1999 | Bilir |
| 5,939,802 A | 8/1999 | Hornbeck |
| 5,949,669 A | 9/1999 | Bruckmann et al. |
| 5,969,436 A | 10/1999 | Chalasani et al. |
| 5,978,236 A | 11/1999 | Faberman et al. |
| 5,982,652 A | 11/1999 | Simonelli et al. |
| 5,998,886 A | 12/1999 | Hoshino et al. |
| 6,011,327 A | 1/2000 | Cook et al. |
| 6,069,412 A | 5/2000 | Raddi et al. |
| 6,118,676 A | 9/2000 | Divan et al. |
| 6,121,695 A | 9/2000 | Loh |
| 6,134,124 A | 10/2000 | Jungreis et al. |
| 6,169,390 B1 | 1/2001 | Jungreis |
| 6,169,669 B1 | 1/2001 | Choudhury |
| 6,184,593 B1 | 2/2001 | Jungreis |
| 6,191,500 B1 | 2/2001 | Toy |
| 6,201,319 B1 | 3/2001 | Simonelli et al. |
| 6,201,371 B1 | 3/2001 | Kawabe et al. |
| 6,274,950 B1 | 8/2001 | Gottlieb et al. |
| 6,288,456 B1 | 9/2001 | Cratty |
| 6,292,379 B1 | 9/2001 | Edevold et al. |
| 6,295,215 B1 | 9/2001 | Faria et al. |
| 6,310,783 B1 | 10/2001 | Winch et al. |
| 6,330,176 B1 | 12/2001 | Thrap et al. |
| 6,381,156 B1 | 4/2002 | Sakai et al. |
| 6,424,119 B1 | 7/2002 | Nelson et al. |
| 6,433,444 B1 | 8/2002 | de Vries |
| 6,441,581 B1 | 8/2002 | King et al. |
| 6,455,954 B1 | 9/2002 | Dailey |
| 6,465,910 B2 | 10/2002 | Young et al. |
| 6,493,243 B1 | 12/2002 | Real |
| 6,629,247 B1 | 9/2003 | Hall et al. |
| 6,630,752 B2 | 10/2003 | Fleming et al. |
| 6,654,265 B2 | 11/2003 | Sadler et al. |
| 6,700,351 B2 | 3/2004 | Blair et al. |
| 6,728,119 B2 | 4/2004 | Reilly et al. |
| 6,747,370 B2 | 6/2004 | Abe |
| 6,757,185 B2 | 6/2004 | Rojas Romero |
| 6,784,641 B2 | 8/2004 | Sakai et al. |
| 6,795,322 B2 | 9/2004 | Aihara et al. |
| 6,803,678 B2 | 10/2004 | Gottlieb et al. |
| 6,825,578 B2 | 11/2004 | Perttu |
| 6,838,925 B1 | 1/2005 | Nielsen |
| 6,906,933 B2 | 6/2005 | Taimela |
| 6,917,124 B2 | 7/2005 | Shetler, Jr. et al. |
| 6,944,035 B2 | 9/2005 | Raddi et al. |
| 6,949,843 B2 | 9/2005 | Dubovsky |
| 6,958,550 B2 | 10/2005 | Gilbreth et al. |
| 6,983,212 B2 | 1/2006 | Burns |
| 6,987,332 B2 | 1/2006 | Mount et al. |
| 7,005,759 B2 | 2/2006 | Ying et al. |
| 7,012,825 B2 | 3/2006 | Nielsen |
| 7,050,312 B2 | 5/2006 | Tracy et al. |
| 7,061,141 B2 | 6/2006 | Yamamoto |
| 7,105,949 B2 | 9/2006 | Wang et al. |
| 7,158,393 B2 | 1/2007 | Schneider |
| 7,259,477 B2 | 8/2007 | Klikic et al. |
| 7,274,112 B2 | 9/2007 | Hjort et al. |
| 7,432,615 B2 | 10/2008 | Hjort |
| 7,453,235 B2 | 11/2008 | Blair et al. |
| 7,456,518 B2 | 11/2008 | Hjort et al. |
| 7,495,415 B2 | 2/2009 | Kanouda et al. |
| 7,521,823 B2 | 4/2009 | Klikic et al. |
| 7,615,891 B2 | 11/2009 | Wu et al. |
| 7,652,393 B2 | 1/2010 | Moth |
| 7,705,489 B2 | 4/2010 | Nielsen et al. |
| 7,737,580 B2 | 6/2010 | Hjort et al. |
| 7,786,618 B2 | 8/2010 | Cohen et al. |
| 7,855,472 B2 | 12/2010 | Hjort et al. |
| 7,939,968 B2 | 5/2011 | Hjort et al. |
| 8,053,927 B2 | 11/2011 | Hjort et al. |
| 2001/0033502 A1 | 10/2001 | Blair et al. |
| 2002/0044469 A1 | 4/2002 | Yasumura |
| 2002/0130555 A1 | 9/2002 | Burke et al. |
| 2002/0130556 A1 | 9/2002 | Hohri |
| 2002/0130648 A1 | 9/2002 | Raddi et al. |
| 2002/0134567 A1 | 9/2002 | Rasmussen et al. |
| 2002/0191425 A1 | 12/2002 | Geissler |
| 2003/0034693 A1 | 2/2003 | Wareham et al. |
| 2003/0048004 A1 | 3/2003 | Fleming et al. |
| 2003/0048005 A1 | 3/2003 | Goldin et al. |
| 2003/0048006 A1 | 3/2003 | Shelter, Jr. et al. |
| 2003/0048647 A1 | 3/2003 | Sadler et al. |
| 2003/0052644 A1 | 3/2003 | Nelson et al. |
| 2003/0062775 A1 | 4/2003 | Sinha |
| 2003/0076696 A1 | 4/2003 | Tsai |
| 2003/0099371 A1 | 5/2003 | Ogura et al. |
| 2003/0111842 A1 | 6/2003 | Gilbreth et al. |
| 2003/0184160 A1 | 10/2003 | Yamamoto |
| 2003/0220026 A1 | 11/2003 | Oki et al. |
| 2004/0010649 A1 | 1/2004 | Weaver et al. |
| 2004/0036361 A1 | 2/2004 | Dai et al. |
| 2004/0084965 A1* | 5/2004 | Welches et al. ............... 307/64 |
| 2004/0084967 A1 | 5/2004 | Nielsen |
| 2004/0155526 A1 | 8/2004 | Naden et al. |
| 2004/0164617 A1 | 8/2004 | Bobb et al. |
| 2005/0036248 A1 | 2/2005 | Klikic et al. |
| 2005/0043859 A1 | 2/2005 | Tsai et al. |
| 2005/0162019 A1 | 7/2005 | Masciarelli et al. |
| 2005/0162129 A1 | 7/2005 | Mutabdzija et al. |
| 2005/0162836 A1 | 7/2005 | Briggs et al. |
| 2005/0168073 A1 | 8/2005 | Hjort |
| 2005/0201127 A1 | 9/2005 | Tracy et al. |
| 2005/0286274 A1 | 12/2005 | Pfitzer et al. |
| 2006/0043792 A1 | 3/2006 | Hjort et al. |
| 2006/0043793 A1 | 3/2006 | Hjort et al. |
| 2006/0043797 A1 | 3/2006 | Hjort et al. |
| 2006/0044846 A1 | 3/2006 | Hjort et al. |
| 2006/0202636 A1 | 9/2006 | Schneider |
| 2006/0226706 A1 | 10/2006 | Edelen et al. |
| 2007/0216229 A1 | 9/2007 | Johnson et al. |
| 2008/0157601 A1 | 7/2008 | Masciarelli et al. |
| 2009/0033154 A1 | 2/2009 | Linkhart et al. |
| 2009/0160254 A1 | 6/2009 | Wu et al. |
| 2009/0231892 A1 | 9/2009 | Klikic et al. |

(56) References Cited

U.S. PATENT DOCUMENTS

| | | |
|---|---|---|
| 2009/0251002 A1 | 10/2009 | Cohen et al. |
| 2010/0225170 A1 | 9/2010 | Hjort et al. |
| 2011/0043042 A1 | 2/2011 | Klikic et al. |
| 2011/0254374 A1* | 10/2011 | Humphrey et al. ............. 307/80 |
| 2012/0119581 A1 | 5/2012 | Silberbauer et al. |

* cited by examiner

APPARATUS AND METHOD FOR PROVIDING UNINTERRUPTIBLE POWER

BACKGROUND OF THE INVENTION

1. Field of Invention

At least one embodiment of the present invention relates generally to control of an uninterruptible power supply.

2. Discussion of Related Art

Uninterruptible power supplies (UPS) are used to provide reliable power to many different types of electronic equipment. Uninterruptible power supplies regulate power provided to a load, and can provide backup power to a load in the event of a loss of primary power, such as during black out or brown out conditions. Unwanted fluctuations in power provided to a load can waste energy and damage electrical equipment, which results in increased cost, a loss of productivity and can require repair or replacement of electrical components.

SUMMARY OF THE INVENTION

Aspects and embodiments described herein are directed to uninterruptable power supply control. At least one aspect is directed to an uninterruptible power supply that includes an input configured to receive input power, an output, and a power conversion circuit coupled with the input and the output. The uninterruptible power supply also includes a bypass switch that is configured to couple the input to the output in a bypass mode of operation, and a controller. The controller is coupled with the power conversion circuit and the bypass switch. The controller is also configured to activate the bypass switch in a first configuration to provide the input power at the output during a first half of a cycle of an input voltage waveform, and the controller is further configured to activate the bypass switch in a second configuration to provide the input power at the output during a second half of the cycle of the input voltage waveform.

In some embodiments, the bypass switch includes a first semiconductor controlled rectifier and a second semiconductor controller rectifier. The first semiconductor controlled rectifier is controlled by the controller to be active in the first configuration and inactive in the second configuration. In some embodiments, the second semiconductor controller rectifier is inactive in the first configuration and controlled by the controller to be active in the second configuration. The first semiconductor controlled rectifier and the second semiconductor controlled rectifier can be controlled by the controller to be in alternate operational states in the bypass mode of operation. In various embodiments, the first and second semiconductor controlled rectifiers are arranged in an anti-parallel configuration.

In some embodiments, the uninterruptible power supply is configured in a bypass mode of operation and includes a backup power source, with the controller configured to activate the power conversion circuit in a reverse mode to charge the backup power source. In one embodiment, wherein the uninterruptible power supply is configured in a bypass mode of operation, the input is configured to receive the input power from an input power source, and the power conversion circuit is configured to operate in parallel with the input power source, wherein the power conversion circuit is configured to provide power at the output within 2 ms from a failure of the bypass mode.

In one embodiment, the controller comprises a phase lock loop circuit and a gate control circuit. The phase lock loop circuit provides the input voltage waveform to the gate control circuit, and the gate control circuit activates the bypass switch in the first configuration or the second configuration based at least in part on the input voltage waveform. The power conversion circuit can also provide power factor correction and reduced harmonic distortion. In one embodiment, the input voltage waveform is substantially in phase with an input current signal.

At least one aspect is directed to a method of distributing power using an uninterruptible power supply having an input, an output, a power conversion circuit, and a bypass switch. The method includes an act of operating the uninterruptible power supply in a bypass mode wherein power at the output is provided from an input power source via the bypass switch. The method also includes acts of controlling the bypass switch to operate in a first configuration to provide power at the output during a first half of a cycle of an input voltage waveform, and controlling the bypass switch to operate in a second configuration to provide power at the output during a second half of the cycle of the input voltage waveform.

In some embodiments, the bypass switch includes a first semiconductor controller rectifier and a second semiconductor controlled rectifier, and the method can include an act of activating the first semiconductor controlled rectifier in the first configuration, wherein the first semiconductor controlled rectifier is active in the first configuration and the second semiconductor controlled rectifier is inactive in the first configuration. The method can also include an act of activating the second semiconductor controlled rectifier in the second configuration, wherein the second semiconductor controlled rectifier is active in the second configuration and the first semiconductor controlled rectifier is inactive in the second configuration.

In one embodiment, the uninterruptible power supply includes a backup power source, and the method includes an act of controlling the power conversion circuit to charge the backup power source. The method may also include acts of receiving input power from an input power source, operating the power conversion circuit in parallel with the input power source, and providing output voltage from the power conversion circuit at the output within 1% of a nominal voltage value between 3.5 ms and 4.5 ms after a failure of the bypass mode.

In one embodiment, the method includes acts of receiving input power from an input power source, operating the power conversion circuit in parallel with the input power source, providing voltage from the power conversion circuit at the output less than 2.5 ms after a failure of the bypass mode, and identifying a drop in output voltage associated with the failure of the bypass mode more than 3.5 ms after the failure of the bypass mode. In some embodiments, the method includes acts of controlling the power conversion circuit to operate as a power factor corrector rectifier, or removing at least part of a harmonic signal from an input current received at the input.

At least one aspect is directed to a system for distributing power with an uninterruptible power supply. The system includes an input configured to receive input power, an output, and a power conversion circuit coupled with the input and the output. The system also includes a bypass switch configured to couple the input to the output in a bypass mode of operation, and a controller coupled with the power conversion circuit and with the bypass switch. The system also includes means for activating the bypass switch in a first configuration during a first half of a cycle of an input voltage waveform, and in a second configuration different from the first configuration during a second half of the cycle to provide the input power at the output.

In some embodiments, the system further includes means for activating a first semiconductor controlled rectifier of the bypass switch in the first configuration, wherein a second semiconductor controlled rectifier of the bypass switch is inactive in the first configuration. The system may also include means for activating the second semiconductor controlled rectifier in the second configuration, wherein the first semiconductor controlled rectifier is inactive in the second configuration.

At least some of these aspects and embodiments are achieved by the methods and systems according to independent claim 1 and any other independent claims. Further details may be found in the remaining dependent claims.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification. The drawings, together with the remainder of the specification, serve to describe and explain the claimed aspects and embodiments.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
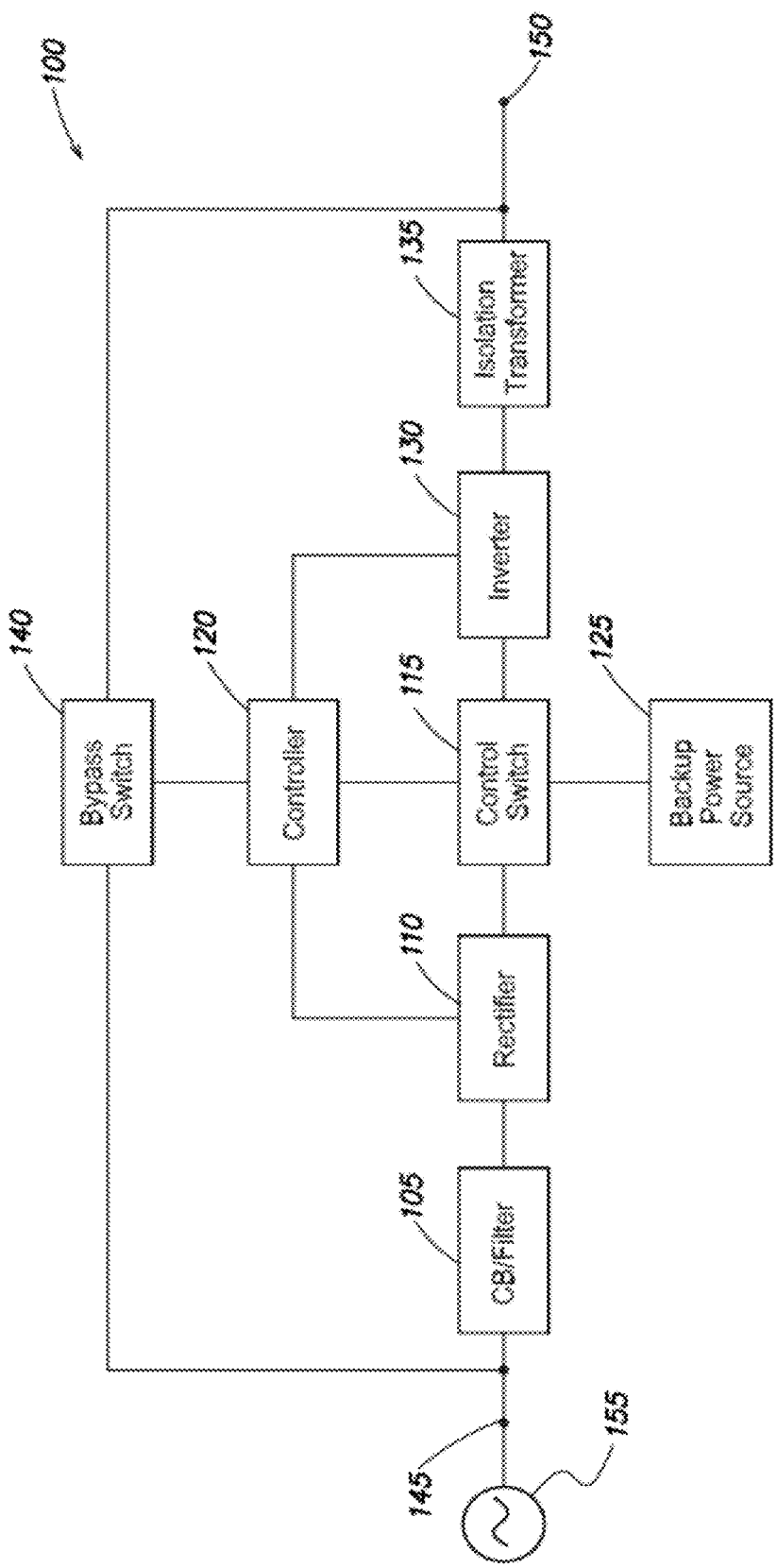
FIG. 1 is a functional block diagram depicting an uninterruptible power supply in accordance with an embodiment.

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including" "comprising" "having" "containing" "involving" and variations thereof herein, is meant to encompass the items listed thereafter, equivalents thereof, and additional items, as well as alternate embodiments consisting of the items listed thereafter exclusively.

Various aspects and embodiments are directed to uninterruptible power supplies. In one example, an uninterruptible power supply (UPS) may include an inverter, a controller, and a bypass switch. In a bypass mode of operation, the controller operates the bypass switch to provide power at the uninterruptible power supply output from an input power source via the bypass switch. The controller can also operate the inverter during online operation to regulate the inverter output voltage and to provide output voltage from the inverter at the UPS output when bypass operation is interrupted. The controller can also operate the inverter during bypass and other operation modes to provide, among other things, power factor correction, harmonic current distortion control, and active power to charge a backup power source.

FIG. 1 is a functional block diagram depicting an uninterruptible power supply (UPS) 100. The uninterruptible power supply 100 includes power conversion circuitry such as a circuit breaker/filter 105, a rectifier 110, a control switch 115, a controller 120, a backup power source 125, an inverter 130, a transformer such as isolation transformer 135, and a bypass switch 140. The uninterruptible power supply 100 also includes at least one input 145 and output 150. The input 145 couples the AC power source 155 with the uninterruptible power supply 100, and the output 150 couples the uninterruptable power supply 100 with a load.

In one embodiment, the circuit breaker/filter 105 receives power from the AC power source 155 via the input 145, filters this input AC power, and provides filtered AC power to the rectifier 110. The rectifier 110 rectifies the filtered AC power, and provides rectified power to the control switch 115. The control switch 115 receives the rectified power from the rectifier 110, and receives DC power from the backup power source 125, such as a battery or fuel cell. Under the control of the controller 120, the control switch 110 provides power from the rectifier 115 to the inverter 130. For example, the controller 120 changes the state of the control switch 115 to couple the rectifier 115 with the inverter 130 when the controller 120 determines that the output power of rectifier 110 is within a tolerance range. In one embodiment, the controller 120 determines that the output power of the rectifier 110 is outside a tolerance range, for example during a black out or brown out condition. In this example, the controller 120 operates control the switch 115 to provide DC power from the backup power source 125 to the inverter 130 directly or via intervening components such as the rectifier 110. The uninterruptible power supply 100 also provides power at the output 150 for a load via the backup power source 125 during failure of the AC power source 155.

The inverter 130 receives DC power output from the rectifier 110 or the backup power source 125, converts the DC power to AC power, and regulates the AC power. In one embodiment where the uninterruptible power supply 100 includes the isolation transformer 135, the inverter 130 provides regulated AC power to the isolation transformer 135. The isolation transformer 135 increases or decreases the voltage of the AC power output from the inverter 130, and provides isolation between the uninterruptible power supply 100 and a load.

In one embodiment, the bypass switch 140 couples the AC power source 155 or the input 145 with the output 150, bypassing at least some components of the uninterruptible power supply 100, (e.g., the rectifier 110) to provide power to the output 150 in a bypass mode of operation. For example, the controller 120 controls the bypass switch 140 to operate in the bypass mode when input power from the AC power source 155 is within a tolerance range, or when there is a failure of the rectifier 110 or other component of the uninterruptible power supply 100.

Figure 2:
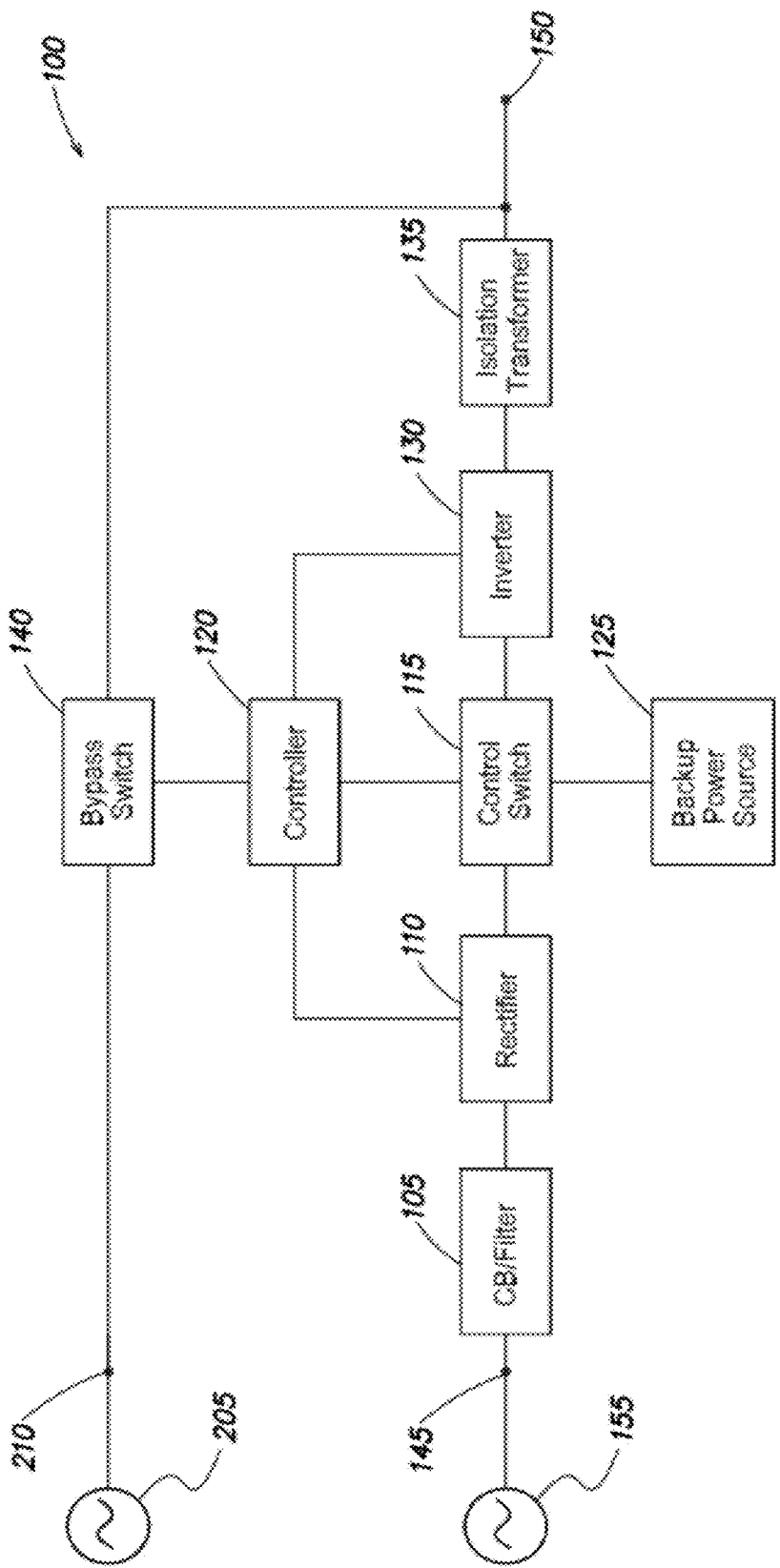
FIG. 2 is a functional block diagram depicting an uninterruptible power supply in accordance with an embodiment.

In one embodiment, the uninterruptible power supply 100 may be part of a dual mains system, as illustrated in FIG. 2, where the AC power source 155 (e.g., via a first main line) can provide input power to rectifier 110 via the input 145, and a second AC power source 205 (e.g., via a second main line) can provide bypass power to the output 150 via the bypass switch 140. For example, the controller 120 operates the bypass switch 140 to couple the input 210 with the output 150 to provide power from the second AC power source 205 at the output 150 to, for example, power a load. In one embodiment, the AC power source 155 is a utility power source, and the second AC power source 205 is a backup generator or other non-utility backup power source. In this example, upon failure of the AC power source 155, the uninterruptible power supply 100 provides power to output the 150 via backup power source 125 while the second AC power source 205 is brought online, (e.g., turned on). When the second AC power source 205 is operating within a tolerance range, the uninterruptible power supply 100 operates in a bypass mode of operation to provide power at the output 150 from the second AC power source 205.

In some embodiments, the input 145 and the input 210 both couple with the AC power source 155, or the second AC power source 205, for example with separate circuit breakers or fuses. If power is lost at the input 145, the input 210 may provide power to the output 150 during bypass operation. In one embodiment, controller 120, backup power source 125, or other UPS 100 components receive power via rectifier 110, during various modes of operation including, for example, bypass operation.

Figure 3:
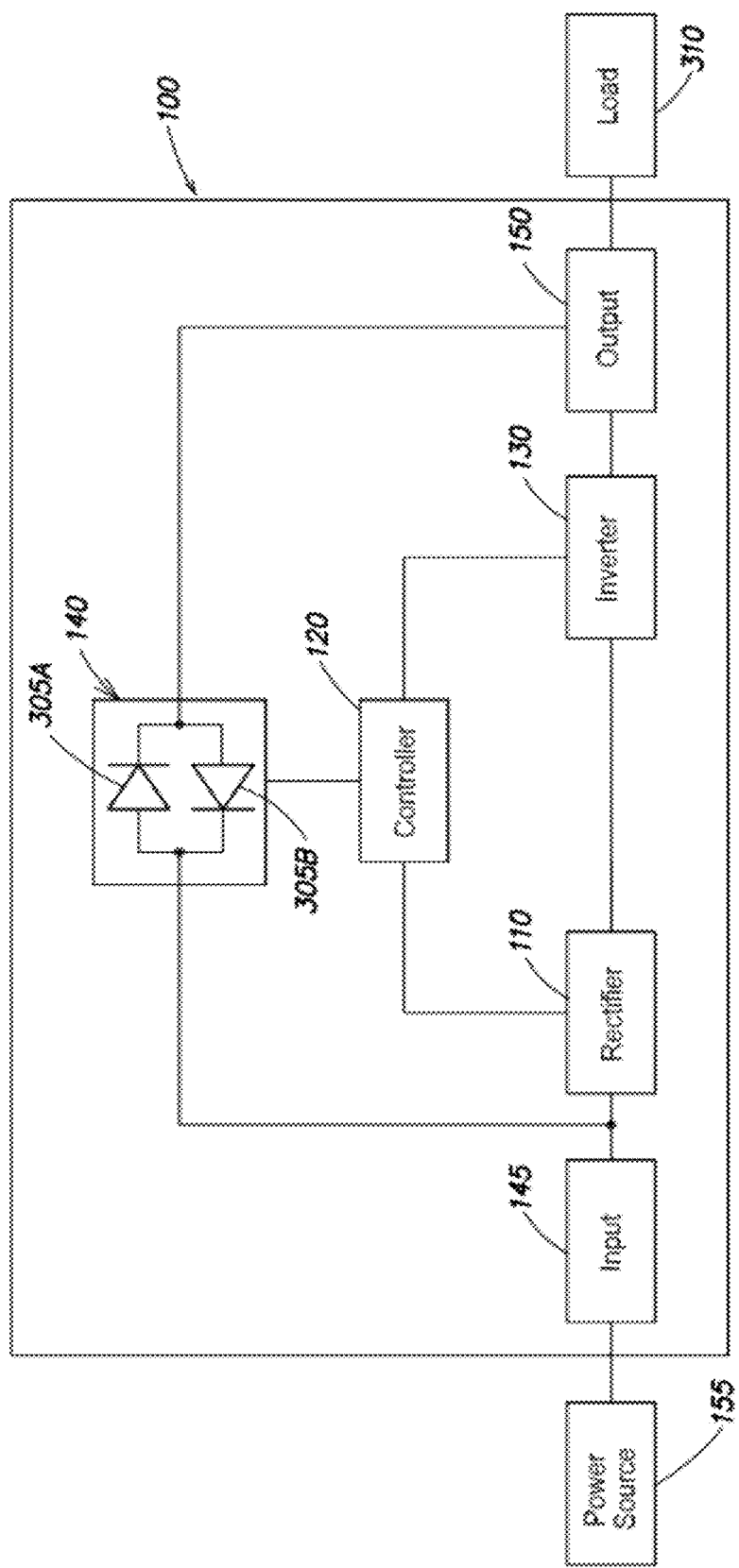
FIG. 3 is a functional block depicting an uninterruptible power supply in accordance with an embodiment.

FIG. 3 is a functional block diagram depicting uninterruptible power supply (UPS) 100. In one embodiment, the bypass switch 140 includes semiconductor controlled rectifiers (SCR's) 305A and 305B arranged in an anti-parallel configuration as illustrated in FIG. 3. The controller 120 selectively activates the semiconductor controlled rectifiers 305A and 305B to activate the bypass switch 140 to provide power from the input 145 at the output 150 in a bypass mode of operation. During a positive half-cycle of the input voltage waveform, the controller 120 activates (e.g., gate ON) the semiconductor controlled rectifier 305A with the semiconductor controlled rectifier 305B in an OFF state. During a negative half-cycle of the input voltage waveform, the controller 120 activates the SCR 305B, with the SCR 305A reverting to the OFF state. In this example, the two semiconductor controlled rectifiers 305 are in alternating states during one full cycle of the input voltage waveform.

In one embodiment, controlling the two SCR's 305 in alternate states throughout the input voltage waveform cycle eliminates or substantially reduces backfeed from the inverter 130 into the main lines upon bypass mode failure, which can occur in a conventional system.

In one embodiment the controller 120 operates the inverter 130 in parallel with the input power main lines during bypass operation of the uninterruptible power supply 100. With the inverter 130 active during bypass operation, the inverter 130 can more quickly provide output power at the output 150 upon loss of bypass power, and can provide near-unity power factor correction (PFC) and harmonic distortion correction at the UPS input. With PFC provided by the inverter 130 during bypass operation, the UPS current and voltage inputs are substantially in phase, and because they are in phase the controller 120 can determine which SCR 305A or 305B is to be activated during which portion of the input voltage cycle. In one embodiment, the controller 120 can activate the inverter 130 to provide output voltage at the output 150 within +/−1% of the nominal output voltage value within 4.0 ms of bypass mode disruption, and within +/−30% within 0.2 ms of bypass mode disruption.

Figure 4:
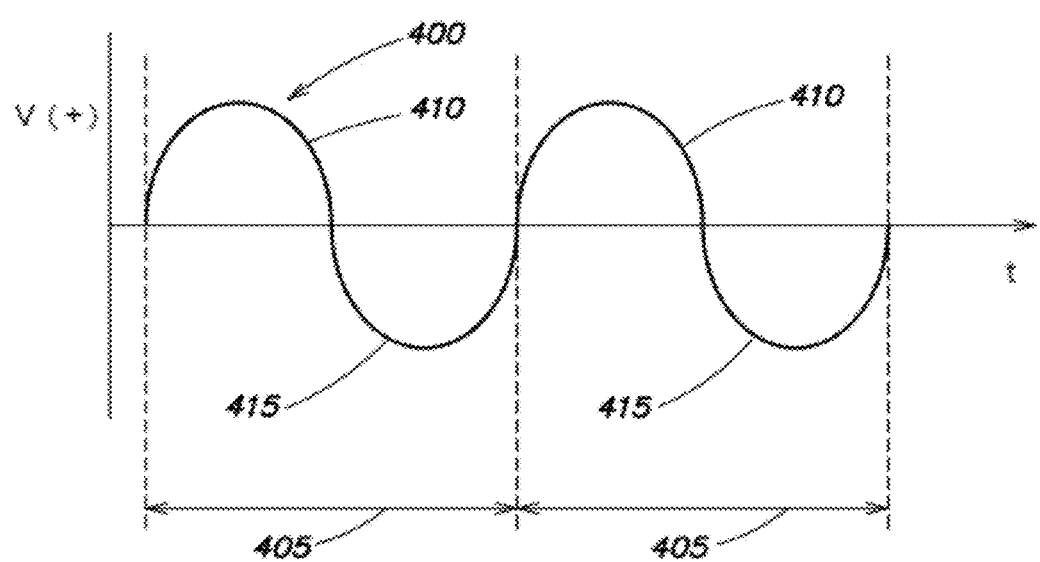
FIG. 4 is a graph depicting an input voltage waveform of an uninterruptible power supply in accordance with an embodiment.

FIG. 4 depicts a typical input voltage signal 400 from the power source 155. The waveform of FIG. 4 includes two cycles 405, each having a positive half-cycle 410 and a negative half cycle 415. In one embodiment, the controller 120 controls the bypass switch 140 to be active in two different configurations during the cycle 405. For example, the controller 120 activates the semiconductor controlled rectifier 305A during the positive half-cycle 410, with the semiconductor controlled rectifier 305B being OFF during the positive half-cycle 410. Continuing with this example, the controller 120 activates the semiconductor controlled rectifier 305B during the negative half-cycle 415, and the semiconductor controlled rectifier 305A reverts to the OFF state. In this example, the bypass switch 140 has two active configurations during the cycle 405, with SCR 305A and SCR 305B being in alternate states (e.g., one SCR 305 is ON with the other OFF) for each half-cycle.

Figure 5:
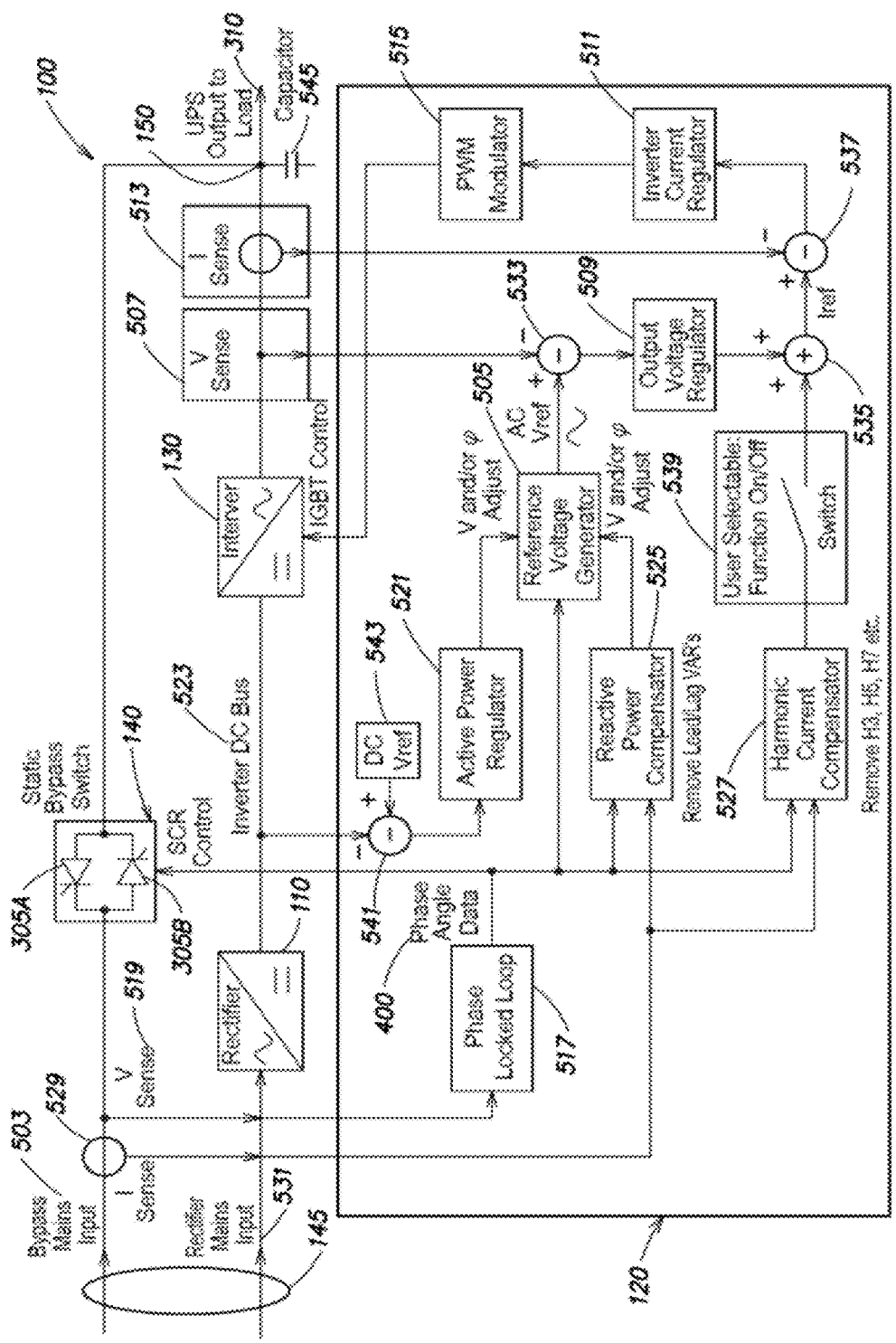
FIG. 5 is a functional block diagram depicting an uninterruptible power supply in accordance with an embodiment.

FIG. 5 is a functional block diagram depicting control of the inverter 130 and of the bypass switch 140 in accordance with one embodiment, which may include capacitor 545 to filter inverter output that is provided to load 310. The controller 120 operates the inverter 130 to provide active power control in a bypass mode of operation. In one embodiment, the controller 120 operates the inverter 130 in parallel with input main lines during bypass operation with increased impedance respective to inverter impedance in on-line or backup operating modes. The controller 120 also controls the inverter 130 to provide active power control of the DC bus voltage between the inverter 130 and the rectifier 110 to regulate charging of the backup power source 125 and to provide operating power to components of the uninterruptible power supply 100. In some embodiments, the controller 120 operates the inverter 130 to provide reactive power control and power factor correction. The controller 120 also operates the inverter 130 to reduce or eliminate harmonic current distortion.

In one embodiment, a reference voltage generator 505 receives phase angle data 400 that is the output of phase locked loop 517, as well as the output of active power regulator 521, (e.g., a control signal that maintains the inverter DC bus voltage 523), and the output of reactive power compensator 525, (e.g., a control signal that removes leading or lagging reactive power from the input current 529). From these received inputs, the reference voltage generator 505 generates reference AC voltage $V_{REF}$, and provides this signal to subtraction function 533, which compares AC $V_{REF}$ with a sensed output voltage 507 and provides a differential output signal to an output voltage regulator 509. A sum function 535 sums the output control signal of the output voltage regulator 509 with the output of a harmonic current compensator 527 (e.g., a control signal to remove distortion from the sensed input current 529) to generate a reference current signal $I_{REF}$. A differential value of between reference current signal $I_{REF}$ and the sensed output current 513 is generated by comparator 537 and provided as input to a current regulator 511. The current regulator 511 provides a regulated current control signal as output to a pulse width modulator (PWM) 515 based on the differential generated by the comparator 537. The PWM 515 receives the current control signal from current regulator 511 as input and generates control signals to control the inverter 130 operation, for example by driving inverter output current towards the value of reference current $I_{REF}$. In one embodiment, PWM control signals output from the pulse width modulator 515 are provided to insulated gate bipolar transistors to control operation of the inverter 130.

In one embodiment, the controller 120 controls the inverter 130 to provide power factor correction at the input 145 approaching unity, (e.g., greater than 0.98) in a bypass mode of operation, with the input voltage 519 and an input current 529 substantially in phase. A phase locked loop 517 receives as input a sensed input bypass voltage 519 (e.g., the main lines voltage), and outputs the voltage signal 400, which indicates the phase angle of the input bypass voltage signal 519. A gate control circuit of the controller 120 may use the voltage signal 400 to control the semiconductor controlled rectifiers 305A and 305B. In the positive half-cycle 410 the gate control circuit triggers SCR 305A and does not trigger SCR 305B. In the negative half-cycle 415 the gate control circuit triggers SCR 305B and does not trigger SCR 305A. The UPS 100 may include an individual gate control circuit for each SCR 305A and B for independent control. The control signals for SCR 305A and SCR 305B are not necessarily active for exactly 50% of the total time, nor do they necessarily exactly follow the time instances of zero crossings of the voltage waveform. In one embodiment, turn-on and turn-off instances of SCR 305A and SCR 305B control signals can differ in leading or lagging directions from the time instances of zero crossings of the input voltage waveform, and the active period for each signal can be above or below 50% of the full cycle time.

The controller 120 may also include the active power regulator 521 for active power control of an inverter DC bus 523, the reactive power compensator 525 to remove 90° lead/lag current and voltage phase differentials for power factor correction, and the harmonic current compensator 527 to remove harmonic distortions from the input current of the UPS 100. In one embodiment, a comparator 541 determines a differential between the inverter DC bus voltage 523 and a DC reference voltage $V_{REF}$ received as input from a DC reference voltage generator 543. The comparator 541 provides the differential as output to the active power regulator 521. Based on the differential signal received from the comparator 541, the active power regulator adjusts or regulates the amplitude or phase of the DC reference voltage and provides a control signal with this information to the voltage reference generator 505. The voltage reference generator 505 generates AC $V_{REF}$ based on voltage or phase angle information from the active power regulator 521, the reactive power compensator 525, and the voltage signal 400, (e.g., the phase locked loop 517 output of the voltage signal 519). During, for example, bypass operation, control loops that include the active power regulator 521 and the reactive power compensator 525 adjust the voltage amplitude or phase of AC $V_{REF}$. The control loop that includes the harmonic current compensator 527 combines with the output voltage regulator 509 to generate reference current value $I_{REF}$ to control the current (e.g., the output current 513) of the inverter 130. The control loop that includes the harmonic current compensator 527 receives the sensed input current 529 and phase locked input voltage signal 400 to remove harmonic distortion from the input current 529. In one embodiment, a user can disable the harmonic current compensator, for example by selective control of switch 539.

In one embodiment, the active power regulator 521 is part of a control loop that maintains the voltage at the inverter DC bus 523 within a desired range. For example, during bypass operation, the rectifier 110 may be powered down, and the inverter 130 may operate in a reverse mode as a rectifier to power the controller 120, other loads coupled with the DC bus 523, or charge the backup power source 125. The differential between reference voltage DC $V_{REF}$ and the sampled DC voltage of the inverter DC bus 523 is provided to the active power regulator 521 and used by the reference voltage generator 505 to determine DC $V_{REF}$. The controller 120 may then operate the inverter 130, using PWM control signals, to drive the DC voltage of the inverter DC bus 523 toward the DC reference voltage, maintaining it within a tolerance range. In one embodiment, the active power regulator 521 is part of a voltage control loop that operates the inverter 130 as a voltage source during bypass operation with increased output impedance from the inverter 130 to facilitate control at the output 150. In the event of a bypass mode failure, the controller 120 operates the inverter 130 to lower its output impedance and provide voltage at the output 150. In one embodiment, in a bypass mode of operation the rectifier 110 supplies at least part of the power requirements of backup power source 125, controller 120, or other components via power from rectifier mains input 531.

In one embodiment, the controller 120 includes the reactive power compensator 525 for reactive power control of the uninterruptible power supply 100. The inverter 130 operates in parallel with the bypass mains input 503 during bypass operation, so current follows a path between the inverter 130 and the mains input 503, dependent on the difference between the bypass voltage 519 and the inverter output voltage 507, as well as the impedance of the inverter 130. In this example, the controller 120 increases the output impedance of the inverter 130 relative to an operating mode where the inverter 130 is not operating in parallel with the mains (e.g., on-line, double conversion, or backup modes). The reference voltage generator 505 adjusts the amplitude or phase angle of inverter reference voltage AC $V_{REF}$ based on inverter output impedance to generate reference inverter control current $I_{REF}$ for active and reactive power control.

In one embodiment, to provide power factor correction the control loop that includes the reactive power compensator 525 take the PLL output signal, add n/2, and uses this as an input to a look-up table, which returns the sine of the input angle. The output of the table corresponds to the cosine of the angle, and is multiplied by the sensed input current 529. This product passes through a low pass filter, and the output of the low pass filter is a value with an amplitude being proportional to the amount of reactive power and with a sign or polarity being positive or negative based on the reactive power being leading or lagging. This value is multiplied by a reference signal, which is the cosine of the phase angle ωt of the voltage at the input 145, to generate the value of reference current $I_{REF}$, which compensates for the imaginary part of input current 529. The sensed input current 529 may be measured directly at the bypass mains input 503 by, for example, a current transformer, or can be derived from the difference between load current and inverter input current.

In one embodiment, the harmonic current compensator 527 controls the inverter 130 to compensate for harmonic currents drawn by the load 310. This control loop cancels harmonic distortion for all phase angles of the harmonic. In one embodiment, the harmonic current compensator 527 includes a control loop for all uneven harmonics (e.g., H3, H5, etc.) from the third to the thirteenth harmonic. For example, to compensate for third harmonic distortion, the phase ωt is multiplied by three, and the sine and cosine are generated to 3 ωt using a sine reference table. These signals are multiplied by the sensed input current 529 and passed through a low pass filter. The resulting value is multiplied to a sine or cosine to generate reference current signal $I_{REF}$. This example can be extended to other harmonics. For example, a table of harmonic current distortion levels of the input current 529 and the output current 513 uneven harmonics H3 through H13 where the uninterruptible power supply 100 provides power to a non-linear load, compliant with IEC 62040-3 Annex E standards, is reproduced below. As indicated in the table, the controller 120 reduces the total harmonic current distortion (THDI) from 105% at the output of the uninterruptible power supply 100 (e.g., at the load side, the output current 513, or the output 150) and 6% at the input of the uninterruptible power supply 100 (e.g. at input current 529).

|      | UPS Input | UPS Output |
|------|-----------|------------|
| H3   | 1.74%     | 83.3%      |
| H5   | 0.59%     | 56.0%      |
| H7   | 0.37%     | 27.6%      |
| H9   | 0.11%     | 6.8%       |
| H11  | 0.19%     | 6.1%       |
| H13  | 0.23%     | 7.2%       |
| THDI | 6.00%     | 105.0%     |

Figure 7:
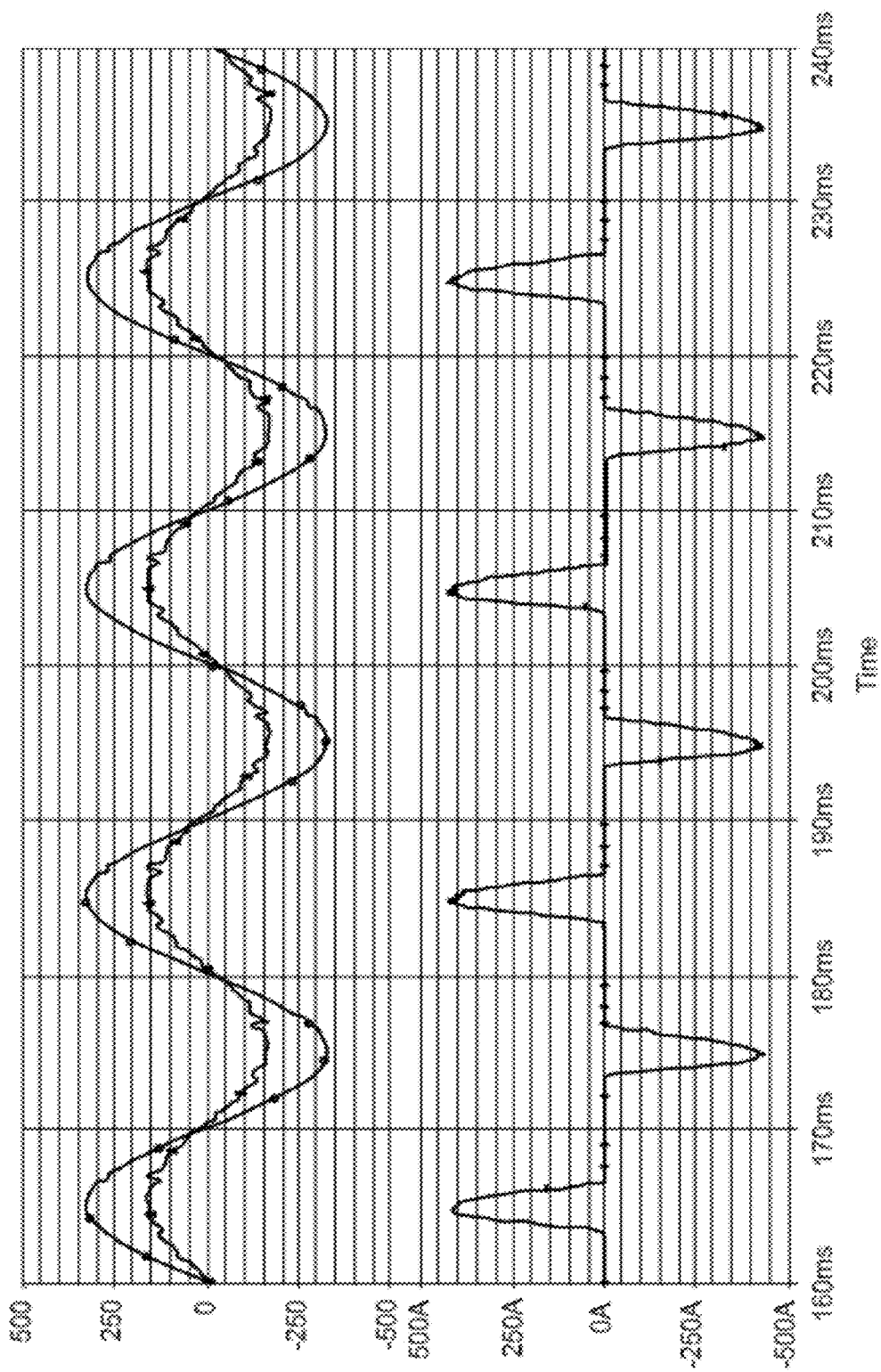
FIG. 7 is a graph depicting input current, output current, and output voltage of an uninterruptible power supply in accordance with an embodiment.

The input current (e.g., at the input 145), output current (e.g., at the output 150), and output voltage (e.g., at the output 150) of the uninterruptible power supply 100 during bypass mode operation with a non-linear load is illustrated in FIG. 7 with harmonic distortion compensation (e.g., as indicated in the above table) and power factor correction (e.g., from 0.7 at the output to greater than 0.9 at the input), where the upper plot depicts the input current and output voltage, and the lower plot depicts the output current.

In one embodiment, the controller 120 operates the inverter 130 to compensate for reactive power and harmonics during bypass operation. The uninterruptible power supply input current and voltage are substantially in phase with each other, and the controller 120 can identify the semiconductor controlled rectifier (SCR) 305 that is to be activated during an identified half-cycle of the input voltage signal 400. By controlling the gating signals of the semiconductor controlled rectifiers 305, one SCR 305 is triggered during one half-cycle, preventing the inverter 130 from backfeeding current into the main lines in the event of a low impedance main failure (e.g., short circuit) at the input 145 during bypass operation. Because the selective activation of the SCR's 305 prevents the inverter 130 from backfeeding current, the controller 120 can turn off the bypass switch 140. In this example the inverter 130 continues operating and can provide output voltage at the output 150.

In one embodiment, the uninterruptible power supply 100 satisfies the standards of the International Electrotechnical Commission, such as international standard IEC 62040-3 for uninterruptible power systems. For example, the uninterruptible power supply 100 output voltage performance, when subjected to main lines voltage failure, (e.g., high or low impedance/short circuit failures) during bypass operation satisfies the IEC 62040-3 classification 1 standard with no more than a 30% interruption of the voltage at the output 150 upon a failure of the mains input voltage 503 during bypass operation, or satisfies the IEC 62040-3 classification 2 standard where the voltage at the output 150 is subject to a 100% interruption for up to 1 mS upon a failure of the mains input voltage 503 during bypass operation. The uninterruptible power supply 100 output voltage performance during bypass operation can also satisfy the IEC 62040-3 classification 3 standard with a 100% interruption for up to 10 mS.

Figure 6:
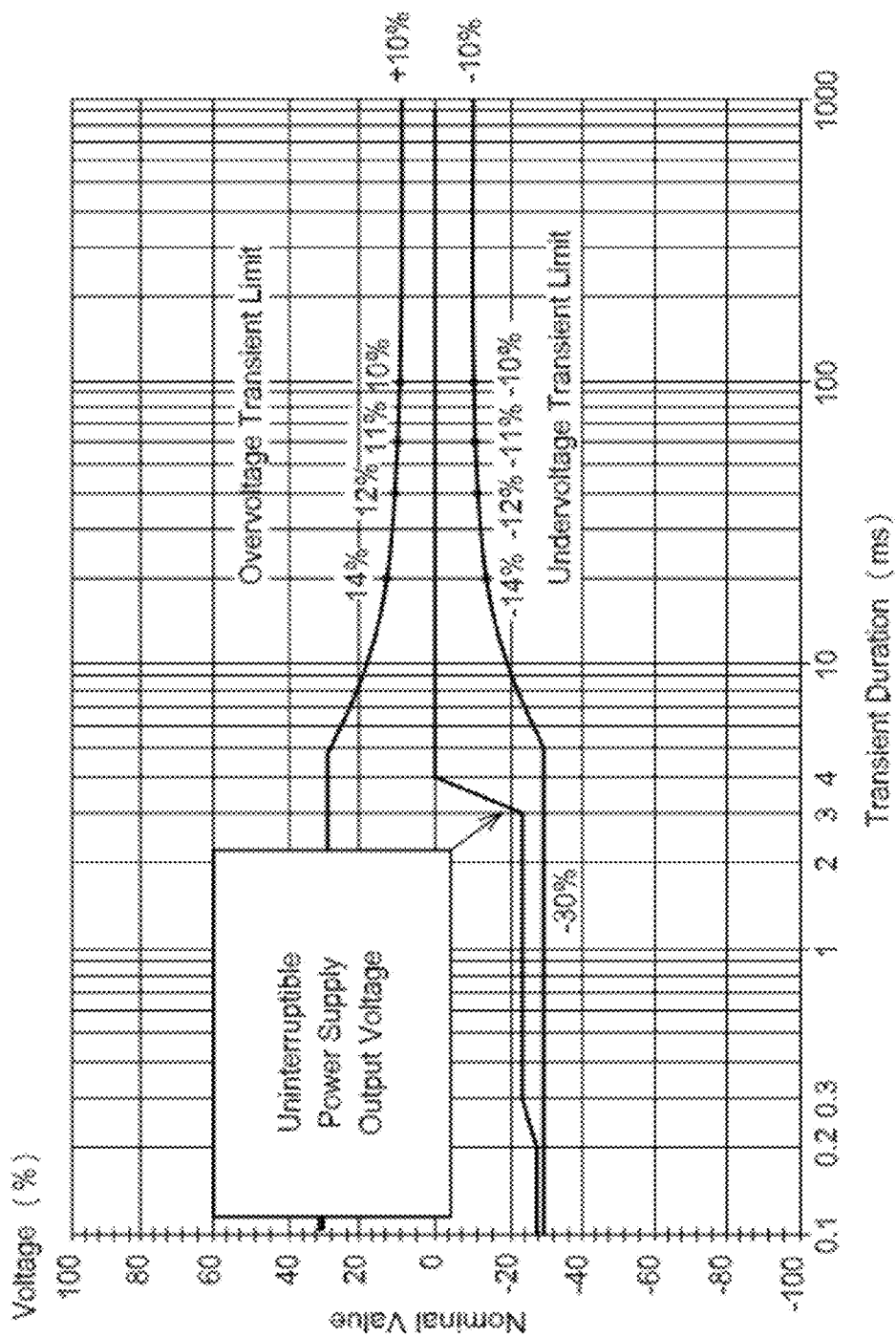
FIG. 6 is a graph depicting output voltage of an uninterruptible power supply in accordance with an embodiment.

In one embodiment, with reference to FIG. 6, approximately 0.1 ms after a bypass mode failure during transition to a backup mode of operation, the voltage at the output 150 drops 30% or less from the nominal output voltage. After approximately 0.2 to 0.3 mS this voltage drop lessens to about 25% for the next approximately 3 ms, and returns to within approximately +/−1% of the nominal value approximately 4 ms after bypass mode failure. In one embodiment, 3 mS is the response time of a voltage detector to detect the voltage at the output 150. In this illustrative embodiment, the controller 120 operates the inverter 130 to provide voltage at the output 150 when there is a bypass mode failure, but before the voltage drop at the output 150 that is associated with the failure of the bypass mode is detected.

Figure 8:
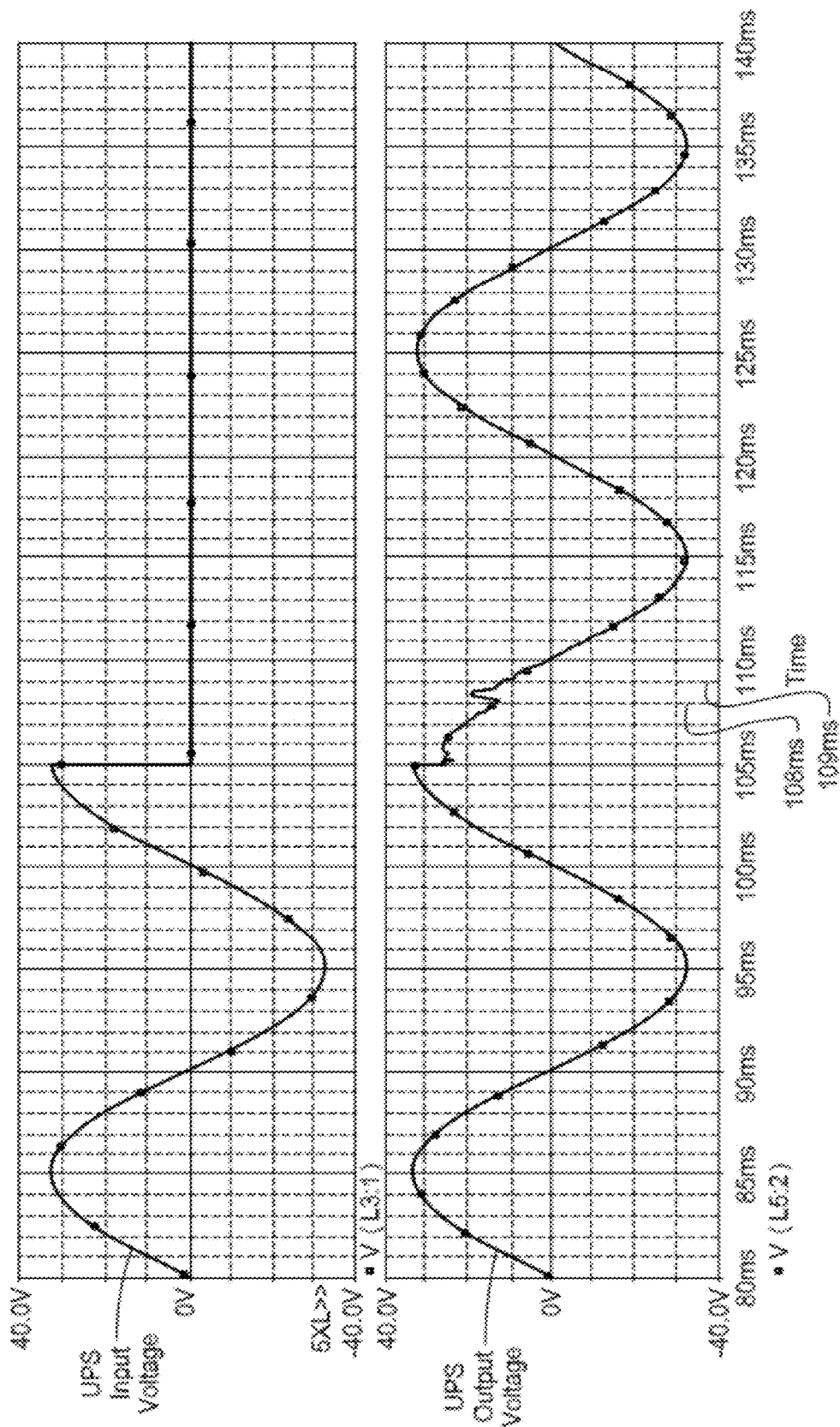
FIG. 8 is a graph depicting input voltage and output voltage of an uninterruptible power supply in accordance with an embodiment.

The voltage at the output 150 upon mains failure is illustrated in FIG. 8, where the upper plot depicts the voltage at the input 145 from the AC power source 155 that is interrupted upon bypass mode failure, and where the lower plot depicts the voltage at the output 150 before and after bypass mode failure. A short circuit at the main lines, the bypass mains input 503, or the input 145 causes input voltage to drop to zero, as illustrated in FIG. 8 at the 105 ms mark. In one embodiment, prior to the bypass mode failure, the inverter 130 is active and operates in parallel with the mains lines during bypass mode. After the bypass mode failure, the uninterruptible power supply 100 operates in an on-line or other non-bypass mode, and the inverter 130 provides voltage at the output 150. In the example of FIG. 8, the voltage at the output 150 recovers to substantially the nominal value between 3 ms and 4 ms after the bypass mode failure, (e.g., between the 108 ms and 109 ms marks).

Figure 9:
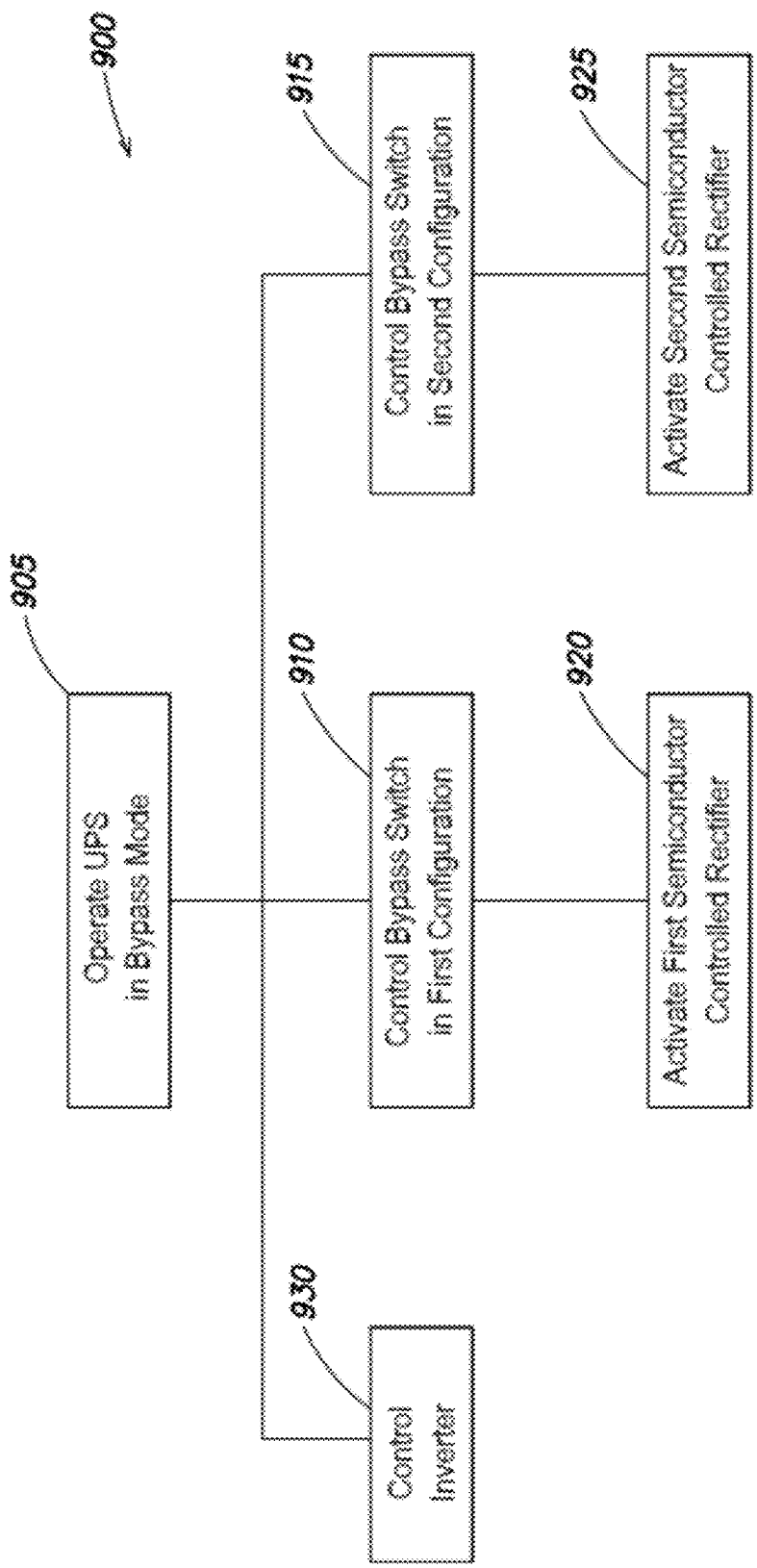
FIG. 9 is a flow chart depicting a method of distributing power using an uninterruptible power supply in accordance with an embodiment.

FIG. 9 is a flow chart depicting a method 900 of distributing power using an uninterruptible power supply (UPS) having an input, an output, an inverter, and a bypass switch, such as the uninterruptible power supply 100. In one embodiment, method 900 includes an act of operating the UPS in a bypass mode (ACT 905) wherein power at the UPS output is provided from an input power source via the bypass switch. The UPS may include power conversion circuitry such as a rectifier, backup power source, and other components, and operating the UPS in the bypass mode (ACT 905) includes providing power from the input at the output, where the power may bypasses the rectifier, backup power source, and other UPS components, which may be at least partially powered down. The input power source may include a utility AC power source or backup AC main line power source coupled with the bypass switch via at least one UPS input. The bypass switch can be in at least one of a plurality of active configurations (e.g., turned on) when the UPS is operating in the bypass mode (ACT 905), and in an inactive or OFF configuration in other modes.

In one embodiment, method 900 includes an act of controlling the bypass switch to operate in a first configuration (ACT 910) that provides power at the output via the bypass switch and from the input power source. Method 900 can also include an act of controlling the bypass switch to operate in a second configuration (ACT 915) to provide power at the output via the bypass switch. During operation in the first configuration (ACT 910) and the second configuration (ACT 915), the bypass switch is active and the UPS is operating in the bypass mode (ACT 905) to provide power at the output. In one embodiment, the bypass switch is in different active states when operating in the first and second configurations. The bypass switch can be deactivated in on-line, double conversion, backup or other operational modes where the bypass switch is in an OFF or inactive state. In one embodiment, the time periods during which the bypass switch is controlled in the first configuration (ACT 910) and the second configuration (ACT 915) are mutually exclusive.

The bypass switch may include first and second semiconductor controlled rectifiers (SCR's) in an anti-parallel configuration. In some embodiments, controlling the bypass switch to operate in the first configuration (ACT 910) includes activating (e.g., turning ON) a first of the two semiconductor controlled rectifiers (ACT 920), with the second SCR in an inactive or OFF state. Controlling the bypass switch to operate in the second configuration (ACT 915) includes activating the second of the two semiconductor controlled rectifiers (ACT 925), with the first SCR in an inactive or OFF state. In one embodiment, the bypass switch is in the first and second configurations during opposite half-cycles of a waveform of the UPS input voltage waveform.

In one embodiment, method 900 includes an act of controlling the UPS inverter (ACT 930). For example, controlling the inverter (ACT 930) may include controlling the inverter to charge a backup power source of the UPS where the inverter operates as a PFC rectifier to provide power factor correction at the UPS input, and to maintain a DC bus voltage within a tolerance range to provide DC power to UPS components such as the controller and to charge the backup power source. In one embodiment, the inverter is controlled (ACT 930) to compensate for harmonic distortion of the UPS input current.

Controlling the UPS inverter (ACT 930) may also include operating the inverter in parallel with the input power source during bypass operation of the UPS to provide voltage at the UPS output upon failure of the bypass mode. In this example, the inverter provides continuous voltage at the UPS output with less than a 30% drop from a nominal voltage level within 0.2 ms of cessation of bypass mode operation. The inverter is also controlled (ACT 930) to provide voltage at the output that is within 1% of the nominal output voltage within approximately 3.5 to 4.5 ms after bypass mode operation ceases.

In one embodiment, inverter voltage can be provided at the output before a voltage detector detects the UPS output voltage drop that occurs when bypass operation ceases, due for example to a short circuit or other failure condition. For example, a voltage detector together with the UPS controller identifies the UPS output voltage drop at bypass mode failure after a delay of 3 ms, 3.5 ms or more. Controlling the inverter (ACT 930) may include providing the inverter voltage at the output less than 2.5 ms after bypass mode operation ceases where the inverter is controlled (ACT 930) to apply voltage at the output upon bypass mode failure before the failure is detected by the UPS controller. In some embodiments, the inverter is controller (ACT 930) with either the first SCR active (ACT 920) or the second SCR active (ACT 930).

Having now described some illustrative embodiments, it is apparent that the foregoing is illustrative and not limiting, having been presented by way of example. In particular, although many of the examples presented herein involve specific combinations of method acts or system elements, it is understood that those acts and those elements may be combined in other ways to accomplish the same objectives. Acts, elements and features discussed only in connection with one embodiment are not intended to be excluded from a similar role in other embodiments.

Note that in FIGS. 1 through 9, the enumerated items are shown as individual elements. In actual implementations of the systems and methods described herein, however, they may be inseparable components of other electronic devices such as a digital computer. Thus, actions described above may be implemented at least in part in software that may be embodied in an article of manufacture that includes a program storage medium. The program storage medium includes non-transitory and other data signals embodied in one or more of a carrier wave, a computer disk (magnetic, or optical (e.g., CD or DVD, or both)), non-volatile memory, tape, a system memory, and a computer hard drive.

From the foregoing, it is appreciated that the systems and methods for distributing power provided by the uninterruptible power supply described herein afford an elegant and effective way to distribute power to a UPS output, where it can be applied to a load. The systems and methods can operate during UPS bypass conditions, which increases efficiency and lowers cost.

Any references to front and back, left and right, top and bottom, or upper and lower and the like are intended for convenience of description, not to limit the present systems and methods or their components to any one positional or spatial orientation.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements to single or plural configurations. References to any act or element being based on any information, act or element may include embodiments where the act or element is based at least in part on any information, act, or element.

Any embodiment disclosed herein may be combined with any other embodiment, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. Such terms as used herein are not necessarily all referring to the same embodiment. Any embodiment may be combined with any other embodiment in any manner consistent with the aspects and embodiments disclosed herein.

References to "or" may be construed as inclusive so that any terms described using "or" may indicate any of a single, more than one, and all of the described terms. Intervening embodiments, acts, or elements are not essential unless recited as such. Any solution to a problem, or any element or act presented herein in the alternative, for example using the word "or," is neither ambiguous nor indirect simply because it may be presented in the alternative. Any such alternative embodiments, solutions, elements, or acts are derivable directly and unambiguously as at least one embodiment independent of any other alternative solutions, elements, or acts.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

One skilled in the art will realize the systems and methods described herein may be embodied in other specific forms without departing from the characteristics thereof. For example, the uninterruptible power supply can be a single phase or three phase uninterruptible power supply. Further, couplings between uninterruptible power supply components include direct couplings and indirect couplings where intervening elements may be present. The controller 120 can include combinations of hardware, software, and firmware, as well as application specific integrated circuits, programmable logic devices, and processors. Input power can be provided by the AC power source, or any second or backup power source, and combinations thereof. Embodiments described with input power from any of these sources may encompass variations thereof where power is provided at least in part from another of these sources. The bypass mode of the uninterruptible power supply may be referred to as an economic, green, or ECO mode, as providing input power from the AC power source at the output via the bypass switch bypasses the rectifier and increases power efficiency. The inverter can have different topologies, and can include two-level and three-level inverters and other topologies or multilevel topologies including four level topologies. Further, bypass mode failures include low impedance and high impedance failures. The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. An uninterruptible power supply, comprising:
an input configured to receive input power;
an output;
a power conversion circuit coupled with the input and the output;
a bypass switch configured to couple the input to the output in a bypass mode of operation;
a controller coupled with the power conversion circuit, and the bypass switch;
the controller configured to activate the bypass switch in a first configuration to provide the input power at the output during a first half of a cycle of an input voltage waveform; and
the controller configured to activate the bypass switch in a second configuration different from the first configuration to provide the input power at the output during a second half of the cycle of the input voltage waveform
wherein the controller comprises a phase lock loop circuit and a gate control circuit, the phase lock loop circuit configured to provide the input voltage waveform to the gate control circuit, and the gate control circuit configured to activate the bypass switch in one of the first configuration and the second configuration based at least in part on the input voltage waveform.

2. The uninterruptible power supply of claim 1, wherein the bypass switch includes a first semiconductor controlled rectifier and a second semiconductor controller rectifier, wherein the first semiconductor controlled rectifier is controlled by the controller to be active in the first configuration and inactive in the second configuration.

3. The uninterruptible power supply of claim 2, wherein the second semiconductor controller rectifier is inactive in the first configuration and controlled by the controller to be active in the second configuration.

4. The uninterruptible power supply of claim 2, wherein the first semiconductor controlled rectifier and the second semiconductor controller rectifier are controlled by the controller to be in alternate operational states in the bypass mode of operation.

5. The uninterruptible power supply of claim 1, wherein the bypass switch includes a first semiconductor controlled rectifier and a second semiconductor controller rectifier arranged in an anti-parallel configuration.

6. The uninterruptible power supply of claim 1, wherein the uninterruptible power supply is configured in a bypass mode of operation, further comprising:

a backup power source; and
the controller configured to activate the power conversion circuit in a reverse mode to charge the backup power source.

7. The uninterruptible power supply of claim 1, wherein the uninterruptible power supply is configured in a bypass mode of operation, further comprising:
the input configured to receive the input power from an input power source; and
the power conversion circuit configured to operate in parallel with the input power source, wherein the power conversion circuit is configured to provide power at the output within 2 ms from a failure of the bypass mode.

8. The uninterruptible power supply of claim 1, wherein the power conversion circuit is configured to provide power factor correction and reduced harmonic distortion.

9. The uninterruptible power supply of claim 1, wherein the input voltage waveform is substantially in phase with an input current signal.

10. A method of distributing power using an uninterruptible power supply having an input, an output, a power conversion circuit, and a bypass switch, the method comprising:
operating the uninterruptible power supply in a bypass mode wherein power at the output is provided from an input power source via the bypass switch;
controlling the bypass switch to operate in a first configuration to provide power at the output during a first half of a cycle of an input voltage waveform; and
controlling the bypass switch to operate in a second configuration to provide power at the output during a second half of the cycle of the input voltage waveform; and
using a phase lock loop circuit and a gate control circuit to activate the bypass switch in one of the first configuration and the second configuration based at least in part on the input voltage waveform.

11. The method of claim 10, wherein the bypass switch includes a first semiconductor controller rectifier and a second semiconductor controlled rectifier, and the method further comprises:
activating the first semiconductor controlled rectifier in the first configuration, wherein the first semiconductor controlled rectifier is active in the first configuration and the second semiconductor controlled rectifier is inactive in the first configuration; and
activating the second semiconductor controlled rectifier in the second configuration, wherein the second semiconductor controlled rectifier is active in the second configuration and the first semiconductor controlled rectifier is inactive in the second configuration.

12. The method of claim 10, wherein the uninterruptible power supply includes a backup power source, and the method further comprises:
controlling the power conversion circuit to charge the backup power source.

13. The method of claim 10, further comprising:
receiving input power from an input power source;
operating the power conversion circuit in parallel with the input power source; and
providing output voltage from the power conversion circuit at the output within 1% of a nominal voltage value between 3.5 ms and 4.5 ms after a failure of the bypass mode.

14. The method of claim 10, further comprising:
receiving input power from an input power source;
operating the power conversion circuit in parallel with the input power source;

providing voltage from the power conversion circuit at the output less than 2.5 ms after a failure of the bypass mode; and identifying a drop in output voltage associated with the failure of the bypass mode more than 3.5 ms after the failure of the bypass mode.

15. The method of claim 10, further comprising:

controlling the power conversion circuit to operate as a power factor corrector rectifier.

16. The method of claim 10, further comprising:

removing at least part of a harmonic signal from an input current received at the input.

\* \* \* \* \*